United States Patent
Hanggi et al.

(10) Patent No.: US 6,721,643 B1
(45) Date of Patent: Apr. 13, 2004

(54) METHOD OF CONTROLLING A CVT SPEED RATIO

(75) Inventors: Roger Hanggi, Saline, MI (US); Ananth Krishnan, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 19 days.

(21) Appl. No.: 10/252,244

(22) Filed: Sep. 23, 2002

(51) Int. Cl.$^7$ ............................................. F16H 61/00
(52) U.S. Cl. ............................. 701/51; 701/57; 474/28
(58) Field of Search ............................. 701/51, 57, 61; 474/28, 18, 69

(56) References Cited

U.S. PATENT DOCUMENTS

| | | | |
|---|---|---|---|
| 4,757,886 A | 7/1988 | Brown et al. ................. | 192/3.3 |
| 5,427,579 A | * 6/1995 | Kanehara et al. ............. | 474/28 |
| 5,967,918 A | * 10/1999 | Knapp et al. ................. | 474/28 |
| 6,299,564 B1 | 10/2001 | Gessler et al. ................ | 477/45 |
| 6,311,113 B1 | 10/2001 | Danz et al. ................... | 701/57 |
| 6,315,693 B1 | 11/2001 | Tayama ....................... | 477/46 |
| 6,336,880 B1 | 1/2002 | Agner ......................... | 474/28 |
| 6,350,215 B1 | 2/2002 | Gierling ....................... | 475/159 |

* cited by examiner

Primary Examiner—Marthe Y. Marc-Coleman
(74) Attorney, Agent, or Firm—Leslie C. Hodges

(57) ABSTRACT

A method is provided for controlling an output/input speed ratio of a continuously variable transmission (CVT) plant including primary and secondary pulleys actuated by primary and secondary pressures ($P_p$, $P_s$), respectively, which generate forces to move the pulleys and adjust a corresponding belt, thereby adjusting the output/input ratio. The method includes calculating a desired force ratio for the CVT plant. Desired primary and secondary pressures ($P_P$, $P_S$) are then determined based, in part, upon the calculated desired force ratio, and the desired $P_S$ and $P_P$ signals are sent to the CVT plant to control operation of the CVT plant. An actual speed ratio is calculated based on measurements of input and output speed from the CVT plant. An error signal is generated based upon the measured actual speed ratio for use in calculating a next sample time desired force ratio which is then used to calculate desired $P_S$ and $P_P$ signals to be sent as inputs to the CVT plant, thereby using the desired force ratio as the controlled variable in controlling the output/input speed ratio of the CVT plant.

7 Claims, 2 Drawing Sheets

METHOD OF CONTROLLING A CVT SPEED RATIO

TECHNICAL FIELD

The present invention relates to a method of controlling an output/input speed ratio of a continuously variable transmission (CVT) in which primary and secondary pressures are controlled.

BACKGROUND OF THE INVENTION

Continuously variable automatic transmissions, also called CVT, for motor vehicles usually include a first cone pulley pair on an input shaft as a primary pulley set and a second cone pulley pair on an output shaft as a secondary pulley set. Each cone pulley pair consists of a first axially stationary pulley and a second axially movable pulley. Between the cone pulley pairs rotates a belt or torque transmission member which is wound around the cone pulley pair.

The running radius of the torque-transmitting belt may be adjusted by adjustment of the cone pulley pairs. Adjustment of the cone pulley pairs, accordingly, adjusts the running radius of the pulley at the input shaft and output shaft, thereby adjusting the output/input speed ratio of the CVT.

In order to adjust the primary or secondary pulley, the respective axially movable pulley is actuated with a pressure medium from a pressure source.

In a typical prior art CVT system, a stepper motor is used to actuate a ratio control valve to control the primary pressure associated with the cone pulley pair at the input shaft. By way of example, a look-up table may be used to control the stepper motor position versus the primary pressure. Accordingly, the primary pressure is not directly monitored or controlled, but rather the stepper motor is directly controlled leading to an indirect control mechanism. The physical delay in the response of the cone pulleys to the pressure input will not allow high control gains, thereby limiting the transient response.

SUMMARY OF THE INVENTION

The present invention provides an improved method of controlling the output/input speed ratio of a CVT by using the force ratio as the controlled variable. The control algorithm uses logic-based switching to boost either the primary or secondary pressure and incorporates dead time compensation along with a model of the CVT plant to overcome delay-induced instability. The controller is a proportional integral (PI) controller having integral anti-windup compensation.

More specifically, one aspect of the invention provides a method of controlling the output/input speed ratio of a continuously variable transmission (CVT) (also called the CVT plant herein) which includes primary and secondary pulleys actuated by primary and secondary hydraulic pressures ($P_P, P_S$), respectively. The pressures generate forces to move the pulleys and adjust a corresponding belt, thereby adjusting the output/input ratio. The method includes calculating a desired force ratio of the CVT plant. Desired primary and secondary pressures ($P_P, P_S$) are then determined based, in part, upon the calculated desired force ratio, and $P_S$ and $P_P$ signals are sent to the CVT plant to control the operation of the CVT plant. The actual speed ratio is calculated based on input and output speed measurements from the CVT plant. An error signal is generated based upon the actual speed ratio for use in calculating a next sample time desired force ratio which is then used to calculate desired $P_S$ and $P_P$ signals to be sent as inputs to the CVT plant, thereby using the desired force ratio as the controlled variable in controlling output/input speed ratio of the CVT plant.

In accordance with a further aspect of the invention, a method is provided for controlling the output/input speed ratio of a CVT which eliminates the possibility of belt slip and also improves transient response. The method includes logic-based determination of which one of the primary and secondary pressures should be boosted. The minimum pressure at which the other one of the primary and secondary pressures may be set to avoid belt slippage is then determined at each time instant, and that minimum pressure is set accordingly. That one of the primary and secondary pressures which is determined to be boosted is then boosted to a higher desired pressure, thereby achieving quick output/input ratio adjustment while avoiding belt slippage.

In accordance with yet another aspect of the invention, a further method is provided for controlling the output/input speed ratio of a CVT which overcomes both instability due to plant delay and poor response due to actuator saturation. The method includes the following steps: (A) calculating desired $P_P$ and $P_S$ signals, providing the desired $P_P$ and $P_S$ signals to a CVT plant with inherent delay, and calculating actual CVT speed ratio (output speed/input speed) from measurements of the input and output speeds from the CVT plant; (B) converting the calculated desired $P_P$ and $P_S$ signals to a calculated force ratio, and inputting the calculated force ratio to a model of the CVT plant; (C) determining a model speed ratio from the model of the CVT plant, and adjusting the model speed ratio for time delay; (D) subtracting the adjusted model speed ratio from the actual CVT speed ratio to provide an adjustment signal; (E) adding the adjustment signal to the determined model speed ratio prior to the delay adjustment of the model speed ratio to provide a delay-adjusted plant speed ratio; and (F) subtracting the delay-adjusted plant speed ratio from a speed ratio reference value to provide an error signal, which is then used in the calculation of desired $P_P$ and $P_S$ values for a next sample time using a proportional-integral anti-windup compensator.

The above objects, aspects, features, advantages and other objects, aspects, features and advantages of the present invention are readily apparent from the following detailed description of the best mode for carrying out the invention when taken in conjunction with the accompanying drawings.

DESCRIPTION OF THE PREFERRED EMBODIMENT

Figure 1:
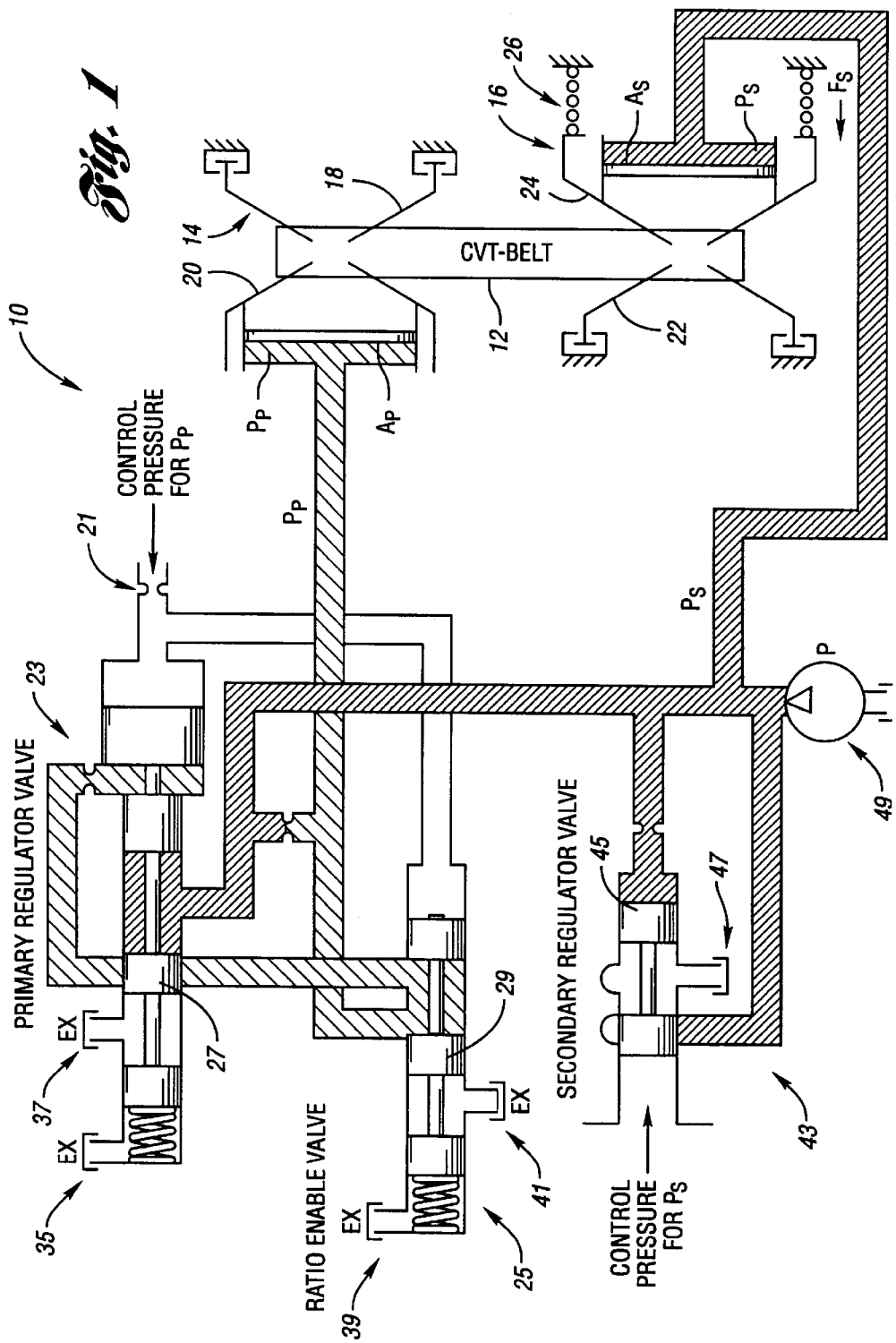
FIG. 1 is a schematic illustration of a CVT plant in accordance with the invention.

FIG. 1 is a schematic illustration of a continuously variable transmission (CVT) plant 10 which includes a torque-transmitting belt 12 engaged with primary and secondary pulleys 14,16. The primary pulley 14 includes an axially stationary pulley member 18 and an axially movable pulley member 20. The primary pulley 14 is rotatably driven by an input shaft (not shown).

The secondary pulley 16 includes an axially stationary pulley member 22 and an axially movable pulley member 24. The secondary pulley 16 is operatively connected to an output shaft (not shown) for rotating the output shaft.

A primary hydraulic pressure $P_p$ is applied against a primary pulley area $A_p$ of the axially movable pulley member 20 to actuate axial movement of the pulley member 20 toward and away from the axially stationary pulley member 18. Similarly, a hydraulic pressure $P_s$ is applied against a secondary pulley area $A_s$ to actuate movement of the axially movable pulley member 24 with respect to the axially stationary pulley member 22, in conjunction with the bias of the spring force associated with the spring 26.

Accordingly, to adjust the output shaft/input shaft speed ratio, the running radius of the torque-transmitting belt 12 at the primary and secondary pulleys 14,16 is adjusted by controlling the primary and secondary pressures $P_p$ and $P_s$ applied to the axially movable pulley members 20,24, respectively. In this manner, the CVT plant 10 is controlled by directly controlling both primary and secondary pressures $P_p$, $P_s$.

FIG. 1 also illustrates the hydraulic control system which provides the primary and secondary pressures ($P_p$, $P_s$). As shown, a control pressure is provided through the control orifice 21 to the primary regulator valve 23 and the ratio enable valve 25. As shown, the primary regulator valve 23 and ratio enable valve 25 each include spool members 27,29 which are movable against respective springs 31,33, and are provided with exhaust ports 35, 37, 39, 41, respectively. The hydraulic pump 49 connected to the engine (not shown) pumps the hydraulic fluid needed for the system's operation.

The secondary pressure regulator 43 similarly includes a spool member 45 and exhaust port 47. As shown, the primary pressure $P_P$ is provided via the primary regulator valve 23 and ratio enable valve 25 to the axially movable pulley member 20. The secondary pressure $P_S$ is provided via the secondary pressure regulator 43 to the axially movable pulley member 24. The secondary pressure $P_S$ is directly sensed by a pressure gauge (not shown) for control purposes.

The present invention provides a method and a corresponding algorithm for controlling the CVT plant 10 by directly controlling the primary and secondary pressures $P_p$ and $P_s$ in such a manner as to achieve quick output/input ratio adjustment while avoiding belt slippage. This method and the algorithm are illustrated in the block diagram of FIG. 2.

Figure 2:
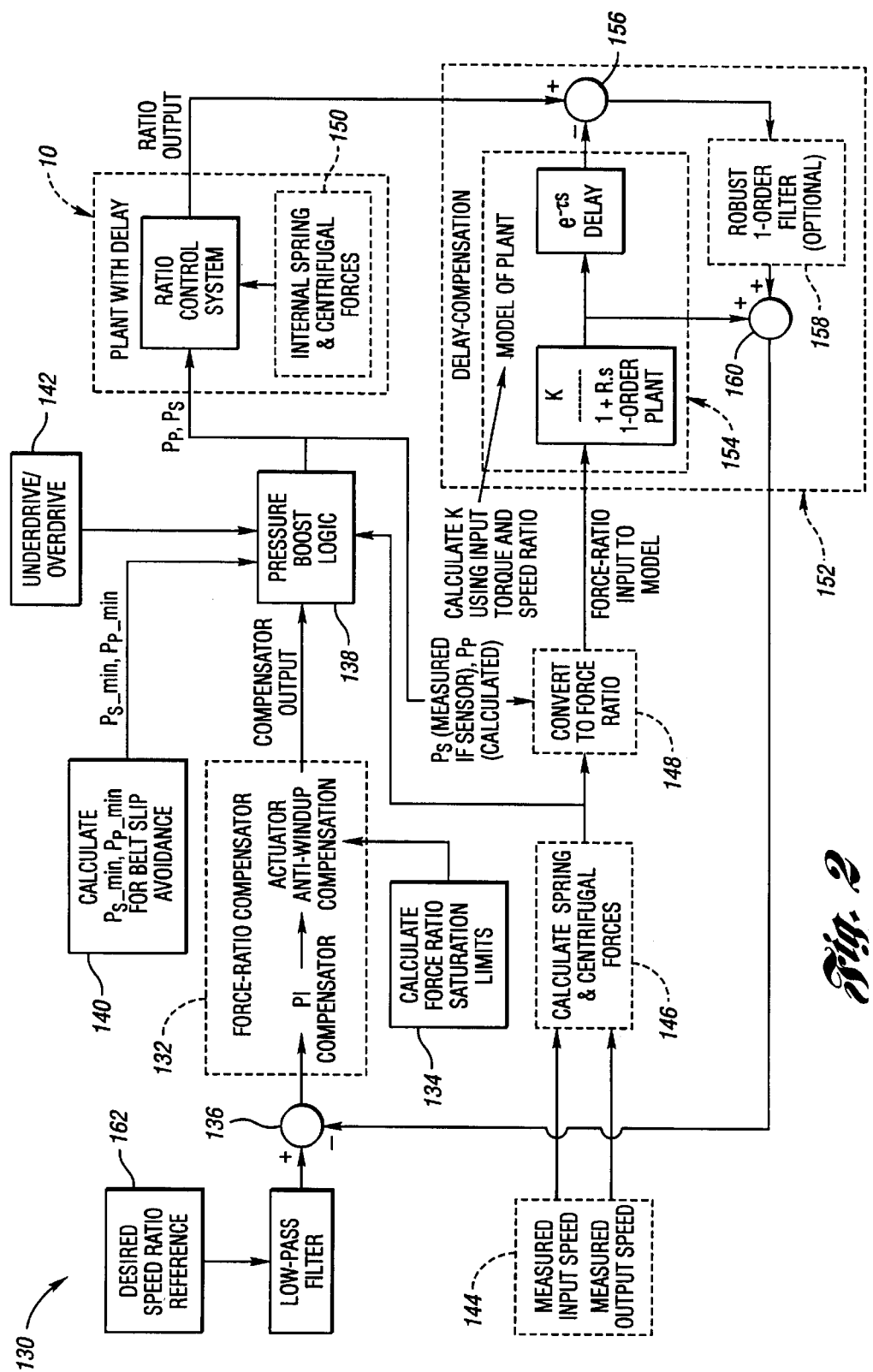
FIG. 2 is a schematic system block diagram for a control system used in the control of the CVT plant of FIG. 1.

As illustrated in FIG. 2, the control scheme 130 begins at the force ratio compensator block 132 in which the algorithm is a proportional integral compensator. This generates a desired force ratio as an output. The inputs to the force ratio compensator block 132 will be described below.

The force ratio compensator block 132 acts upon an error signal received from the summation block 136 (to be described below), and incorporates actuator anti-windup compensation. Integral windup happens when, due to saturation in the actuator, the steady state error cannot go to zero and the integrator in a proportional integral (PI) or proportional integral derivative (PID) controller continues to integrate. Then, when a request is received to change direction, it may take the integrator considerable time to "unwind" its accumulated value and change direction. The anti-windup compensation of force ratio control block 132 provides significantly improved response time.

In the CVT ratio control system (control scheme) illustrated in FIG. 2, saturations occur because of physical limits on the force ratio input to the CVT ratio system. These saturations must be compensated for. Force ratio saturation limits are calculated in the "calculate force ratio saturation limits" block 134 as an input to the force ratio compensator block 132. These saturation limits will be changing at each time sample depending on the CVT plant's current operating point. Not having the correct limits will mean diminished anti-windup compensation. The limits can be calculated as follows:

$$SatHi = (A_{pri}P_{sec\_current} + F_{pri\_cent})/(A_{sec}P_{sec\_current} + F_{sec\_cent} + F_{sec\_spring})$$

$$SatLo = (A_{pri}P_{pri_{13}\ min} + F_{pri\_cent})/(A_{sec}P_{sec\_max} + F_{sec\_cent} + F_{sec\_spring})$$

where:

SatHi=the high saturation limit of the force ratio,

SatLow=the low saturation limit of the force ratio, $A_{pri}$=the area of applied primary force, $P_{sec\_current}$=sensed current secondary pressure, $P_{pri\_min}$=calculated minimum primary pressure to avoid slippage, $F_{pri\_cent}$=calculated primary centrifugal force from the rotating primary fluid, $A_{sec}$=area of applied secondary pressure, $P_{sec\_current}$=current sensed secondary pressure, $P_{sec\_max}$=calculated maximum available secondary pressure, $F_{sec\_cent}$=calculated secondary force from centrifugal pressure (calculated from sensed rotational speed), and $F_{sec\_spring}$=spring force at the secondary pulley.

In force ratio compensator block 132, the force ratio compensator output u(k), which is equal to the desired force ratio, is calculated as follows:

$$v(k) = K\_PIAlpha*v(k-1) + K\_PIGain1*Errortrk(k) + K\_PIGain1*K\ PIGain2*Errortrk(k-1) + (1-K\_PIAlpha)*u(k-1)$$

Also, if v(k)>SatHi, then u(k)=SatHi, or else

If v(k)<SatLo, then u(k)=SatLo, or else u(k)=v(k)

wherein v(k) is an intermediate, unsaturated controller calculation variable, and u(k) is the saturated controller output. Also, K_PIAlpha is a number between 0 and 1. If it is 0, then there is no anti-windup compensation. If it is between 0 and 1, then there is anti-windup compensation.

Accordingly, the output from the force ratio compensator block 132 is the desired force ratio (u(k)), which is then input to the pressure boost logic block 138.

In this manner, the desired force ratio (u(k)) is operative as the controlled variable in controlling the output/input speed ratio of the "CVT plant with delay" block 10.

There are several inputs to the pressure boost logic block 138. $P_{S\_min}$ and $P_{P\_min}$ are calculated at belt slip avoidance block 140 and input to the pressure boost logic block 138. $P_{S\_min}$ and $P_{P\_min}$ are determined from estimated input torque and current ratio. The underdrive/overdrive block 142, which is an input to the pressure boost logic block 138, is simply a determination as to which direction the ratio is proceeding (i.e., whether the output/input ratio is increasing or decreasing).

Input/output speed measurement block 144 and force calculation block 146 also provide inputs to the pressure boost logic block 138 by measuring input and output speed (block 144) and calculating spring and centrifugal forces (block 146).

Based upon the above-referenced inputs to the pressure boost logic block 138, the pressure boost logic increases either of $P_{sec}$ or $P_{pri}$, depending upon which direction the ratio needs to be changed to (i.e., from underdrive to overdrive or vice versa). The pressure boost logic block 138 operates as follows:

$P_{pri\_control}(k)=[PI\_Antiwindup\_Controller\_Output*$
$(P_{sec\_min}A_{sec}+F_{cent\_sec}+F_{spr})-Fcent_{pri}]/A_{pri}$ $P_{sec\_control}(k)=\{[(P_{pri\_min}A_{pri}+F_{cent\_pri})/PI\_Antiwindup\_Controller\_Output]-F_{cent\_sec}-F_{spr}\}/A_{sec}$ $P_{pri\_desired}(k)=MAX(P_{pri\_control}(k), P_{pri\_min}(k))$ $P_{sec\_desired}(k)=MAX(P_{sec\_control}(k), P_{sec\_min}(k))$ In the above equations, PI_Antiwindup_Controller_Output is the above-described output from the force ratio compensator, which is the desired force ratio (u(k)). Again, it is the desired force ratio which is operative as the controlled variable in the control system. As described previously, $P_{sec\_min}$ is the calculated minimum secondary pressure to avoid slip, $A_{sec}$ is the area of applied secondary pressure, $F_{cent\_sec}$ is the calculated secondary centrifugal pressure (calculated based on sensed secondary speed), $F_{spr}$ is the spring force (calculated based on both speeds), $F_{cen_{13}pri}$ is the primary centrifugal force (calculated based on sensed primary speed), $A_{pri}$ is the area of applied primary pressure, and $P_{pri\_min}$ is the minimum primary pressure calculated to avoid slippage.

Only one of $P_{pre\_desired}$ and $P_{pri\_desired}$ will be boosted based upon which direction the ratio is changing. Both $P_{sec\_desired}$ and $P_{pri\_desired}$ will be output from the pressure-boost-logic block 138. Accordingly, either $P_P$ or $P_S$ is set at a minimum to avoid belt slippage, and the other is boosted to a desired boost pressure, which is calculated in the pressure boost logic block 138. These signals are then sent to the "CVT plant with delay" block 10, and to force ratio conversion block 148.

Within the "CVT plant with delay" block 10, the $P_P$ and $P_S$ signals are received, and the CVT plant (shown in FIG. 1) operates accordingly, subject to the effects of the "internal spring and centrifugal forces" block 150. The output from the CVT plant is the actual speed ratio (calculated from input and output speed measurements).

Delay or dead-time in a plant can make a plant difficult to control due to the actual plant output not being "correctly aligned in time" with the desired plant output. Accordingly, the delay compensation block 152 is provided to compensate for the plant delay.

As mentioned above, the outputs $P_P$ and $P_S$ from the pressure boost logic block 138 are also sent to the force ratio conversion block 148 to be converted to a force ratio, which is then fed into a model of the CVT plant at the first order CVT plant block 154 without delay.

As shown in first order CVT plant block 154, a model speed ratio is determined without delay using the first order model of the plant. The model speed ratio is then adjusted for delay and subtracted at the summation block 156 from the actual speed ratio of the "CVT plant with delay" block 10 to produce an adjustment signal which is sent through an optional robust first order filter block 158 to a summation block 160, where it is added to the determined model speed ratio prior to the delay adjustment. A delay-adjusted plant speed ratio is output from the summation block 160 to be subtracted from the low pass filtered desired speed ratio reference block 162 at the summation block 136.

Accordingly, the delay compensation block 152 "aligns in time" the desired speed ratio with the actual speed ratio. The delay-adjusted plant speed ratio is then sent to the summation block 136 to adjust the desired speed ratio reference from desired speed ratio reference block 162 to provide an error signal which is then used in the force ratio compensator block 132 in the calculation of the next desired force ratio to be used in the pressure boost logic block 138 to generate the desired $P_P$ and $P_S$ values for the next sample time.

Accordingly, the controller acts, in an ideal situation of perfect modeling, on a simulated process. This makes the controller behave as if there was no dead-time in the process.

This system achieves cost savings by using the pressure-based control system instead of a stepper motor-based system, which would be more expensive. Significant performance improvement is achievable with this method due to the improved response time of the ratio system. Quality improvement is achieved by the use of a robust controller which will work across production variations. Also, time savings are achieved because the calibration engineer's task is made easy by having lesser calibrations which can potentially cause instability. Additionally, the PI controller is a simple controller which most engineers, calibrators, and algorithm engineers are familiar with. Further, the instability problem is handled sufficiently with the dead-time compensation scheme.

While the best mode for carrying out the invention has been described in detail, those familiar with the art to which this invention pertains will recognize various alternative designs and embodiments for practicing the invention within the scope of the appended claims.

What is claimed is:

1. A method of controlling the output/input speed ratio of a continuously variable transmission (CVT) plant including primary and secondary pulleys actuated by primary and secondary pressures ($P_P, P_S$), respectively, which generate forces to move the pulleys and adjust a corresponding belt, thereby adjusting the output/input ratio, the method comprising:
    calculating a desired force ratio of the CVT plant;
    determining desired primary and secondary pressures $P_P, P_S$) based, in part, upon the calculated desired force ratio and sending desired $P_S$ and $P_P$ signals to the CVT plant to control operation of the CVT plant;
    calculating the actual speed ratio from the CVT plant based on input and output speed measurements; and
    generating an error signal based upon the actual speed ratio for use in calculating a next-sample-time desired force ratio which is then used to calculate desired $P_S$ and $P_P$ signals to be sent as inputs to the CVT plant, thereby using the desired force ratio as the controlled variable in controlling the output/input speed ratio of the CVT plant.

2. The method of claim 1, wherein said desired force ratio of the CVT plant is determined, in part, using the following formula:

$$ForceRatio = \frac{A_P P_P + F_{P\_centrifugal}}{A_S P_S + F_{S\_centrifugal} + F_{S\_spring}}$$

wherein:
    $A_P$=area of applied primary pressure,
    $P_P$=primary pressure,
    $F_P$=primary centrifugal pressure force,
    $A_S$=area of applied secondary pressure,
    $P_S$=secondary pressure,
    $F_{S\_centrifugal}$=secondary centrifugal pressure force,
    $F_{S\_spring}$=spring force.

3. The method of claim 1, wherein said desired primary and secondary pressures ($P_P, P_S$) are determined by a pressure boost logic in which a boost pressure is calculated and selected based upon the desired force ratio minimum primary and secondary pressures, primary and secondary centrifugal forces, spring force, and areas of applied primary and secondary pressures.

4. The method of claim 1, further comprising using dead-time compensation along with a model of the CVT plant to compensate for delay in the calculated actual speed ratio to produce a delay-adjusted plant speed ratio output, and generating said error signal based upon a desired speed ratio reference and said delay-adjusted plant speed ratio output.

5. The method of claim 1, further comprising calculating force ratio saturation limits, in real time, using the following equations:

$$SatHi = (A_{pri} P_{sec\_current} + F_{pri\_cent})/(A_{sec} P_{sec\_current} + F_{sec\_cent} + F_{sec\_spring})$$

$$SatLo = (A_{pri} P_{pri\_min} + F_{pri\_cent})/(A_{sec} P_{sec\_max} + F_{sec\_cent} + F_{sec\_spring})$$

where:

SatHi=the high saturation limit of the force ratio,

SatLow=the low saturation limit of the force ratio, $A_{pri}$=the area of applied primary force, $P_{sec\_current}$=sensed current secondary pressure, $P_{pri\_min}$=calculated minimum primary pressure to avoid slippage, $F_{pri\_cent}$=calculated primary centrifugal force from the rotating primary fluid, $A_{sec}$=area of applied secondary pressure, $P_{sec_{13}\ current}$=current sensed secondary pressure, $P_{sec\_max}$=calculated maximum available secondary pressure, $F_{sec\_cent}$=calculated secondary force from centrifugal pressure (calculated from sensed rotational speed), and $F_{sec\_spring}$=spring force at the secondary pulley; and using the calculated force ratio saturation limits for anti-windup compensation in determining the calculated next-sample-time desired force ratio.

6. A method of controlling an output/input speed ratio of a continuously variable transmission (CVT) including primary and secondary pulleys actuated by primary and secondary pressures ($P_P, P_S$), respectively, which generate forces to move the pulleys and adjust a corresponding belt, thereby adjusting the output/input ratio, the method comprising:

determining which one of the primary and secondary pressures should be boosted;

determining a minimum pressure at which the other one of the primary and secondary pressures may be set to avoid belt slippage and setting said other one at the determined minimum pressure; and boosting said one of the primary and secondary pressures to a higher desired pressure, thereby achieving quick output/input ratio adjustment while avoiding belt slippage.

7. A method of controlling an output/input speed ratio of a continuously variable transmission (CVT) plant including primary and secondary pulleys actuated by primary and secondary pressures ($P_P, P_S$), respectively, which generate forces to move the pulleys and adjust a corresponding belt, thereby adjusting the output/input ratio, the method comprising:

calculating desired $P_P$ and $P_S$ signals, providing the desired $P_P$ and $P_S$ signals to a CVT plant with inherent delay, and determining actual CVT speed ratio (output speed/input speed) from the CVT plant;

converting the calculated desired $P_P$ and $P_S$ to a calculated force ratio, and inputting the calculated force ratio to a model of the CVT plant;

determining a model speed ratio from the model of the CVT plant and adjusting the model speed ratio for time delay;

subtracting the adjusted model speed ratio from the determined actual CVT speed ratio to provide an adjustment signal;

adding the adjustment signal to the determined model speed ratio prior to the delay adjustment of the model speed ratio to provide a delay-adjusted plant speed ratio; and subtracting the delay-adjusted plant speed ratio from a speed ratio reference value to provide an error signal, which is then used in the calculation of desired $P_P$ and $P_S$ values for a next sample time.

* * * * *